F. A. BOWER.
AXLE SPINDLE.
APPLICATION FILED AUG. 27, 1917.
1,289,098.
Patented Dec. 31, 1918.
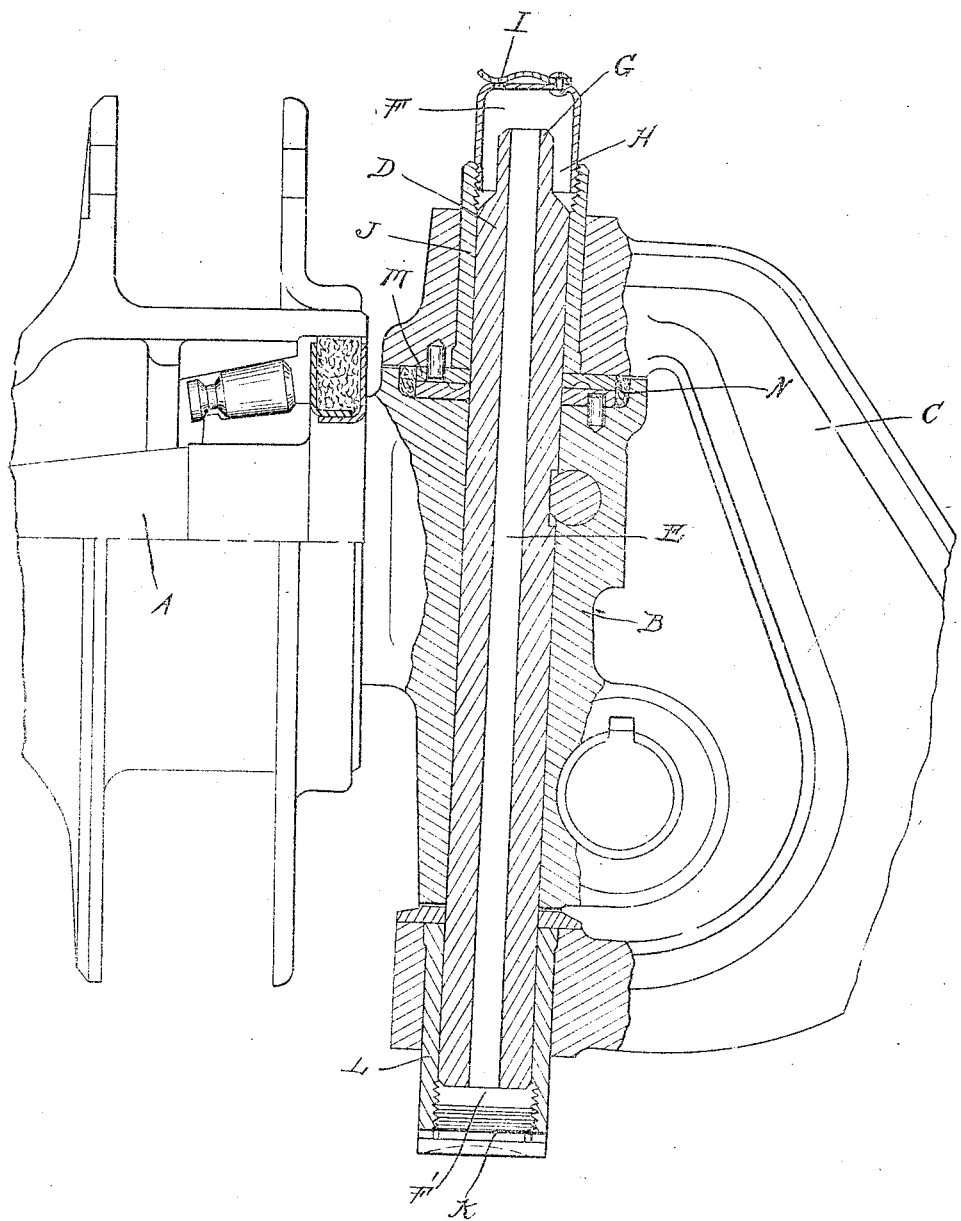
Inventor
Ferdinand A. Bower
By Whittemore Hulbert & Whittemore
Attorneys

UNITED STATES PATENT OFFICE.

FERDINAND A. BOWER, OF FLINT, MICHIGAN, ASSIGNOR TO GENERAL MOTORS CORPORATION, OF DETROIT, MICHIGAN, A CORPORATION OF DELAWARE.

AXLE-SPINDLE.

1,289,098.

Specification of Letters Patent.   Patented Dec. 31, 1918.

Application filed August 27, 1917.   Serial No. 188,375.

*To all whom it may concern:*

Be it known that I, FERDINAND A. BOWER, a citizen of the United States of America, residing at Flint, in the county of Genesee and State of Michigan, have invented certain new and useful Improvements in Axle-Spindles, of which the following is a specification, reference being had therein to the accompanying drawings.

The invention relates to axle spindles for the mounting of the steering wheels of a motor vehicle, and has particular reference to the construction of the king-bolt and means for maintaining the working joints lubricated.

In the drawings:

The figure is a vertical central section through the king-bolt and axle spindle.

A is the axle spindle which is formed with the hub or bearing portion B, C is the bifurcated end of the stationary axle for embracing the hub B and D is a king-bolt for connecting the hub with bearings in the furcations of the stationary axle. This king-bolt is hollow, having the central passage E extending from end to end thereof and communicating with lubricant chambers F and F' at opposite ends of the bolt. The upper end of the bolt D is formed with a portion G reduced in diameter so as to form an annular surrounding chamber H. I is a lubricant-containing receptacle connected to the upper bushing J, preferably by a threaded engagement therewith, and K is a plug in the lower bushing L for forming the chamber F'. M are end-thrust bearing plates arranged in a recess in the hub portion B and between the same and the upper furcation of the stationary axle. N is an annular packing in the recess surrounding the plates M.

In use, a cup F is filled with lubricant, a portion thereof entering the annular channel H surrounding the upper end G of the king-bolt, while another portion passes downward through the central passage E in said king-bolt to the chamber F' at the lower end thereof. The hydrostatic pressure of the lubricant within the central passage E will force it upward between the king-bolt and the lower bushing L, and in the same manner the hydrostatic pressure of the liquid in the annular chamber H will force the lubricant downward between the upper bushing and the king-bolt and thence between the end-thrust bearing plates M. This will insure satisfactory lubrication of all of the working joints, the lubricant being supplied thereto from a single cup or container.

What I claim as my invention is:

1. The combination with an axle spindle and a bifurcated bearing therefor, of a hollow king-bolt for connecting said spindle with said bifurcated bearing, bushings in the furcations of said bearing surrounding said king-bolt, a lubricant container connected to the upper bushing, a portion of said king-bolt extending upward into said lubricant container and forming an annular partition therein, and a closure engaging the lower bushing for forming a lubricant container therein communicating through the hollow king-bolt with said upper lubricant container.

2. The combination with an axle spindle, of a bifurcated bearing therefor, a hollow king-bolt for pivotally connecting said spindle with the furcations of said bearing, bushings in the furcations of said bearing surrounding said king-bolt, end-thrust bearings between said spindle and furcations, a lubricant container connected with the upper bushing, an upward extension of the king-bolt forming an annular partition in said lubricant container, and a plug in the lower end of said lower bushing, for the purpose described.

3. The combination with an axle spindle and a bifurcated bearing therefor, of a hollow king-bolt for connecting said spindle with said bifurcated bearing, bushings in the furcations of said bearing surrounding said king-bolt, a lubricant container connected to the upper bushing, and a closure engaging the lower bushing for forming a lubricant container therein communicating through the hollow king-bolt with said upper lubricant container.

4. The combination with an axle spindle, of a bifurcated bearing therefor, a hollow king-bolt for pivotally connecting said spindle with the furcations in said bearing, bushings in the furcations of said bearing surrounding said king-bolt, end-thrust bearings between said spindle and furcations, a lubricant container connected with the upper bushing, and a closure engaging the lower end of said lower bushing, for the purpose described.

5. The combination with an axle spindle and a bifurcated bearing therefor, of a hollow king-bolt for connecting said spindle with said bifurcated bearing, bushings in the furcations of said bearing surrounding said king-bolt, a lubricant container connected to the upper bushing, the king-bolt having a reduced upper end portion extending into said lubricant container, and a delivery passage from the interior of the king-bolt to the lower bushing.

In testimony whereof I affix my signature.

FERDINAND A. BOWER.